United States Patent
Goto

(10) Patent No.: US 12,160,732 B2
(45) Date of Patent: Dec. 3, 2024

(54) COMMUNICATION APPARATUS, COMMUNICATION METHOD, AND NON-TRANSITORY COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 17/194,026

(22) Filed: Mar. 5, 2021

(65) Prior Publication Data

US 2021/0195410 A1  Jun. 24, 2021

Related U.S. Application Data

(63) Continuation of application No. PCT/JP2019/033217, filed on Aug. 26, 2019.

(30) Foreign Application Priority Data

Sep. 11, 2018  (JP) .................... 2018-169661

(51) Int. Cl.
*H04W 12/0431* (2021.01)
*H04W 12/041* (2021.01)
*H04W 12/06* (2021.01)
*H04W 12/55* (2021.01)

(52) U.S. Cl.
CPC ..... *H04W 12/0431* (2021.01); *H04W 12/041* (2021.01); *H04W 12/06* (2013.01); *H04W 12/55* (2021.01)

(58) Field of Classification Search
CPC ............. H04W 12/0431; H04W 12/55; H04W 12/041; H04W 12/06
See application file for complete search history.

(56) References Cited

U.S. PATENT DOCUMENTS

| 10,169,587 | B1 * | 1/2019 | Nix .................... H04W 4/60 |
| 2013/0044741 | A1 | 2/2013 | Lappetelaeinen |
| 2013/0318573 | A1 | 11/2013 | Reunamaki et al. |

(Continued)

FOREIGN PATENT DOCUMENTS

| CN | 103563453 A | 2/2014 |
| CN | 107667554 A | 2/2018 |
| CN | 108476542 A | 8/2018 |

OTHER PUBLICATIONS

Device Provisioning Protocol Specification, Version 1.0, Apr. 9, 2018, Apr. 2018, pp. 20-26,33-34,45-46,53-55,78-81.

*Primary Examiner* — Kevin Bechtel
*Assistant Examiner* — Forrest L Carey
(74) *Attorney, Agent, or Firm* — Canon U.S.A., Inc. IP Division

(57) ABSTRACT

Based on an instruction for starting communication parameter sharing processing using a Wi-Fi Device Provisioning Protocol, a public key to be used in the communication parameter sharing processing is shared, and authentication processing with a providing apparatus that provides a communication parameter is executed using the shared public key. After the authentication processing, a Configuration Request packet indicating a request for a plurality of network identifiers is generated, and the generated Configuration Request packet is transmitted to the providing apparatus.

7 Claims, 8 Drawing Sheets

(56) References Cited

U.S. PATENT DOCUMENTS

2016/0081009 A1* 3/2016 Tailor .................... H04W 48/16
 455/432.1
2017/0180433 A1* 6/2017 Gupta ................... H04W 76/20
2017/0295448 A1 10/2017 McCann et al.
2018/0302783 A1* 10/2018 Mestanov ............... H04W 8/22

* cited by examiner

FIG.5

```
{
"name": "MyDevice",
"wi-fi_tech": "infra",
"netRole": "sta",
"security": "dpp+wpa3",
"multinet": "on"
}
```

FIG.6

```
{
"wi-fi_tech2": "infra",
"num": "2",
"cred2":
{
   "ssid": "abcde",
   "akm": "dpp",
   "signedConnector":
   "xxxxxxxxxxxxxxxxxxxxxxxxxxxxxxxxxxxxxxxxxxxxxxxxxxxxxxxxxxxxxxxxxxxxxxxxxxxx
Xxxxxxxxxxxxxxxxxxxxxxxxxxxxxxxxxxxx",
   "csign":
   {
    "kty": "EC",
    "crv": "P-256",
    "x": "yyyyyyyyyyyyyyyyyyyyyyyyyyyyyyyy",
    "y": "zzzzzzzzzzzzzzzzzzzzzzzzzzzzzzzz",
    "kid": "kkkkkkkkkkkkkkkkkkkkkkkkkkkkkkkkkkkkkkkkkkkk",
   }
}
"cred2":
   {
    "ssid": "vwxyz",
    "akm": "sae",
    "pass": "1234567890",
   }
}
```

COMMUNICATION APPARATUS, COMMUNICATION METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2019/033217, filed Aug. 26, 2019, which claims the benefit of Japanese Patent Application No. 2018-169661, filed Sep. 11, 2018, both of which are hereby incorporated by reference herein in their entirety.

BACKGROUND OF THE INVENTION

Field of the Invention

The present invention relates to a communication apparatus, a communication method, and non-transitory computer-readable storage medium.

Background Art

In recent years, there have been cases increasing where a digital camera, a printer, a mobile phone, a smartphone, etc. are equipped with a wireless communication function and these communication apparatuses are connected to a wireless network and used.

To connect a communication apparatus to a wireless network, it is necessary to set various communication parameters, such as an encryption scheme, an encryption key, an authentication scheme, and an authentication key. As a technology that makes it easy to set these communication parameters, a standard (Wi-Fi Device Provisioning Protocol, hereinafter referred to as DPP) has been established in which a setting protocol for communication parameters using, for example, a Quick Response (QR) Code® is defined.

In DPP discussed in PTL1, a configurator that provides communication parameters provides information necessary for connection to an access point to an enrollee that receives the communication parameters.

CITATION LIST

Patent Literature

PTL1: US-2017-0295448

In the DPP specification, it has been possible to distribute only one network identifier, such as a Service Set Identifier (SSID), and it has been impossible to distribute a plurality of network identifiers widely used in, for example, corporate access points.

SUMMARY OF THE INVENTION

Various embodiments of the present disclosure provide techniques and mechanisms for easily setting a plurality of network identifiers in parameter sharing processing using Device Provisioning Protocol (DPP).

According to one embodiment of the present invention, there is provided a communication apparatus which comprises: an acceptance unit configured to accept an instruction for starting communication parameter sharing processing using a Wi-Fi Device Provisioning Protocol; an execution unit configured to execute processing of sharing a public key to be used in the communication parameter sharing processing, based on the instruction; an authentication unit configured to execute authentication processing with a providing apparatus that provides a communication parameter, using the public key shared by processing of the execution unit; a generation unit configured to generate a Configuration Request packet indicating a request for a plurality of network identifiers, after the authentication processing; and a transmission unit configured to transmit the Configuration Request packet generated by the generation unit to the providing apparatus.

Further features of the present invention will become apparent from the following description of exemplary embodiments with reference to the attached drawings.

BRIEF DESCRIPTION OF THE DRAWINGS

FIG. 5 illustrates an example of request information of an enrollee apparatus according to the present exemplary embodiment.

FIG. 6 illustrates an example of response information of a configurator apparatus according to the present exemplary embodiment.

DESCRIPTION OF THE EMBODIMENTS

A communication apparatus according to the present exemplary embodiment will be described in detail below with reference to the drawings. An example using a wireless local area network (LAN) system compliant with the Institute of Electrical and Electronics Engineers (IEEE) 802.11 series will be described below. However, a communication configuration is not necessarily limited to a wireless LAN compliant with the IEEE 802.11.

Figure 3:
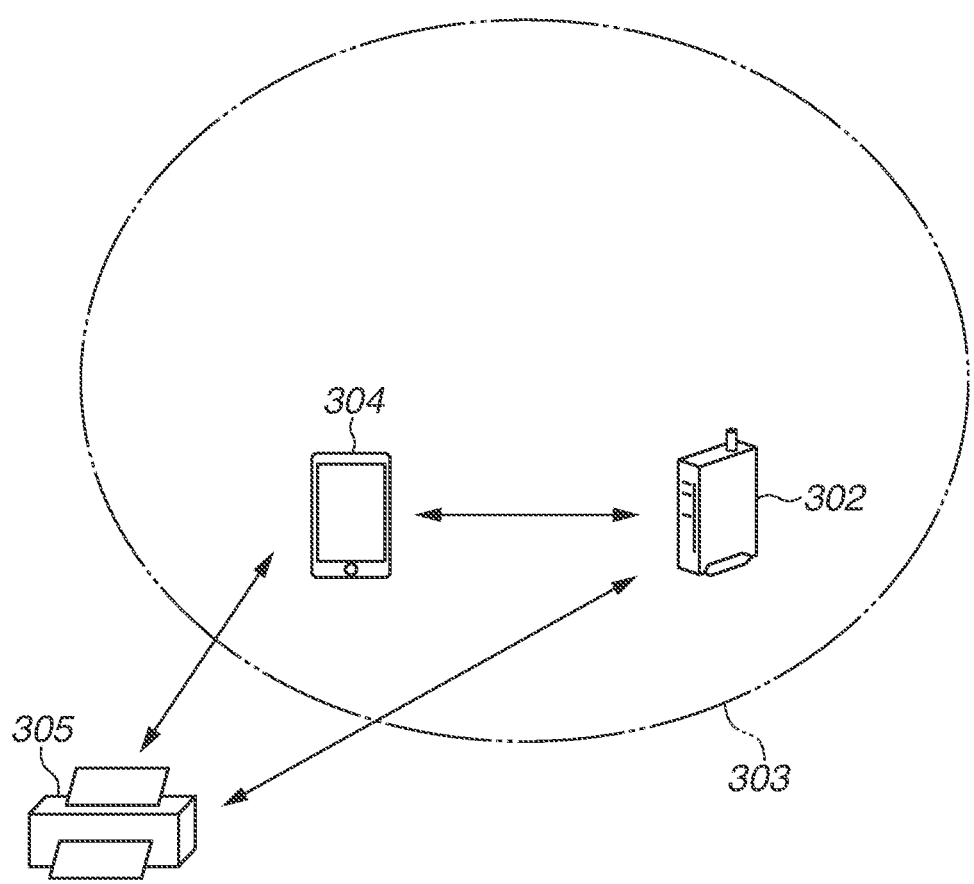
FIG. 3 illustrates an example of a configuration of a communication system.

FIG. 3 illustrates a configuration of a communication system according to the present exemplary embodiment. The communication system includes an access point 302, a smartphone 304, a printer 305, and a wireless LAN network 303 (hereinafter, the network 303). Processing in a case where the printer 305 joins the network 303 formed by the access point 302 will be described below. The smartphone 304 operates as a configurator defined in DPP, and provides information for connecting to the access point 302 to the printer 305.

In the present exemplary embodiment, communication apparatuses in the communication system are described as a smartphone, an access point, and a printer, but may be other communication apparatuses, such as a mobile phone, a camera, a personal computer (PC), a video camera, a smartwatch, and a personal digital assistant (PDA). The number of the apparatuses of the communication system is described to be three, but may be two, or four or more.

Figure 1:
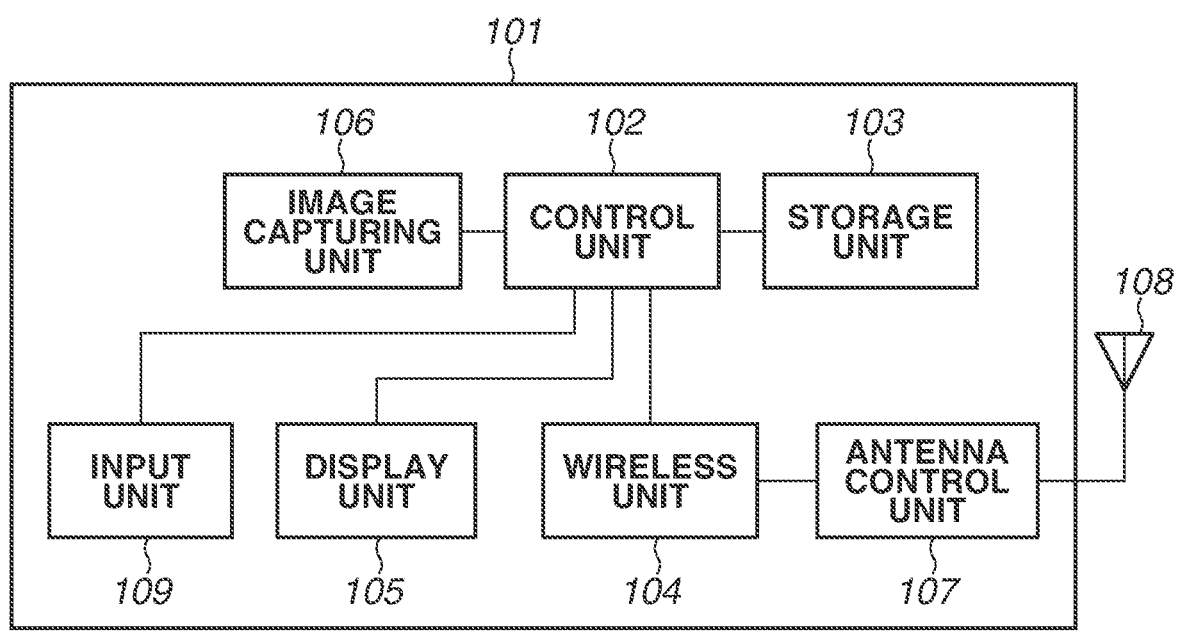
FIG. 1 illustrates a hardware configuration of a communication apparatus.

Next, a hardware configuration according to the present exemplary embodiment of the communication apparatus of the communication system illustrated in FIG. 3 will be described with reference to FIG. 1. FIG. 1 illustrates an entire apparatus of a communication apparatus 101. A control unit 102 controls the entire apparatus by executing a control program stored in a storage unit 103. The control unit 102 is configured of, for example, one or more processors, such as central processing units (CPUs). A storage unit 103 stores the control program executed by the control unit 102, image data, and various kinds of information, such as communication parameters. The control unit 102 executes the control program stored in the storage unit 103, and thereby various kinds of operation described below are performed. The storage unit 103 is configured of, for example, one or more read only memories (ROMs), random access memories (RAMs), hard disk drives (HDDs), flash memories, or storage mediums, such as a removable Secure Digital (SD) card.

A wireless unit 104 performs wireless LAN communication compliant with the IEEE 802.11 series. The wireless unit 104 is configured of a chip that performs wireless communication. A display unit 105 is a display unit, such as a liquid crystal display (LCD) or light-emitting diode (LED), which performs various kinds of display to output visually recognizable information. Alternatively, the display unit 105 has a function of outputting sound like a speaker. The display unit 105 has a function of outputting at least either one of visual information and sound information. In a case where visual information is displayed, the display unit 105 has a Video RAM (VRAM) that holds image data corresponding to the visual information to be displayed. The display unit 105 controls display for causing the LCD or LED to keep displaying the image data stored in the VRAM.

An image capturing unit 106 is an image capturing unit configured of, for example, an image sensor, and a lens, and the image capturing unit 106 captures photographs or videos. The image capturing unit 106 captures images of a barcode, or a two-dimensional code, such as a QR Code®. An antenna control unit 107 controls output of an antenna 108. The antenna 108 is an antenna capable of communicating in the 2.4-GHz band and/or the 5-GHz band for communicating with a wireless LAN. An input unit 109 is an input unit provided for a user to operate the communication apparatus 101 by performing various inputs, etc. The input unit 109 stores a flag corresponding to an input in a memory, such as the storage unit 103. The example illustrated in FIG. 1 is one example, and the communication apparatus may have other hardware configurations. For example, in a case where the communication apparatus is a printer, a printing unit may be provided in addition to the configuration illustrated in FIG. 1. In a case where the communication apparatus 101 is an access point 302, the image capturing unit 106 and the display unit 105 may be excluded.

Figure 2:
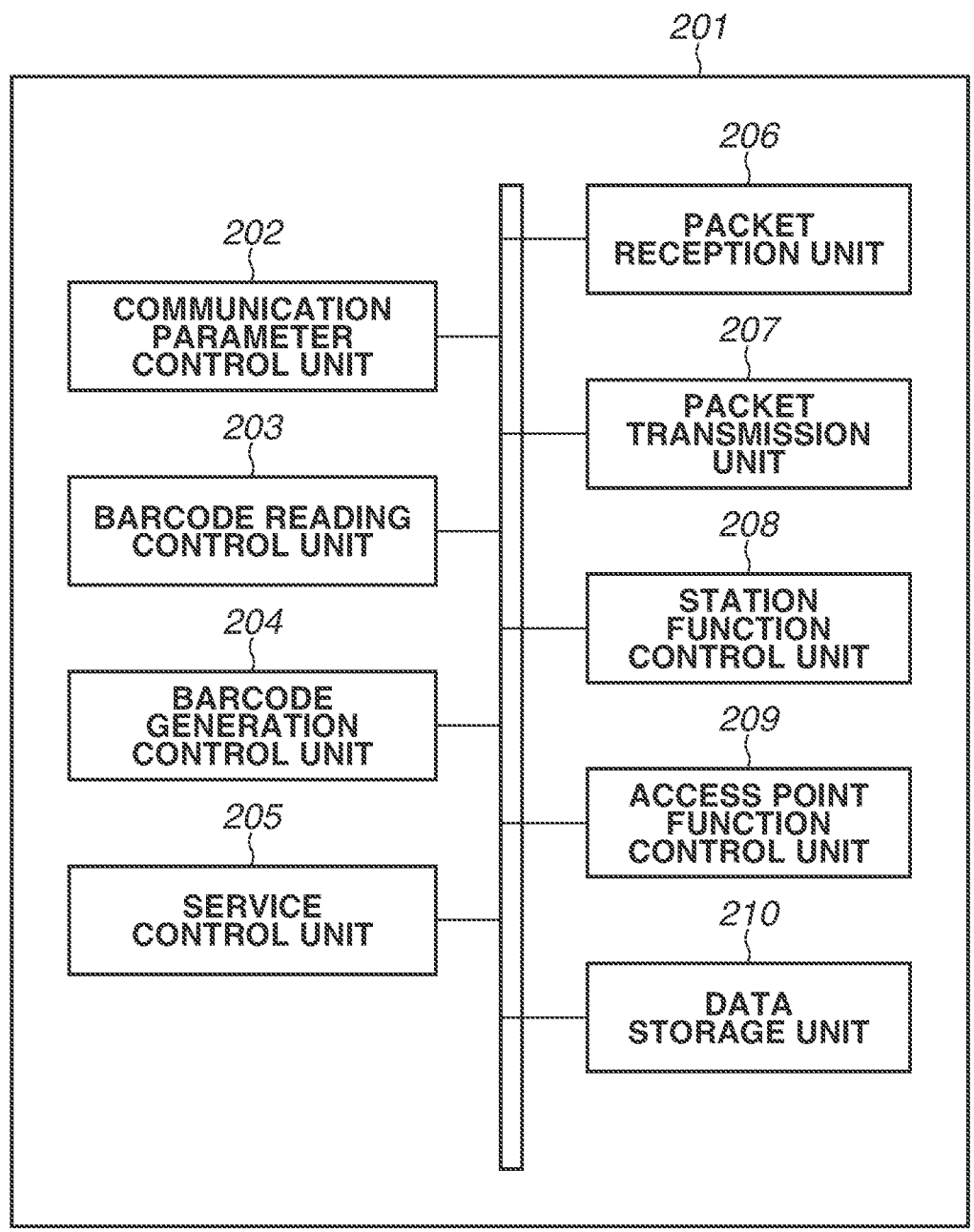
FIG. 2 illustrates a software functional configuration of a communication apparatus.

FIG. 2 is a block diagram illustrating an example of a configuration of a software functional block that executes a communication control function described below. In the present exemplary embodiment, each functional block of each of the communication apparatuses is stored in the storage unit 103 as a program, and the function of the program is performed by the execution of this program by the control unit 102. The control unit 102 implements each function by controlling each piece of hardware and computing or processing information based on the control program. A part or all of the present functional block may be provided as hardware. In this case, a part or all of each of the functional blocks is configured of, for example, an Application Specific Integrated Circuit (ASIC).

FIG. 2 illustrates an entire software functional block 201. A communication parameter control unit 202 is a communication parameter control unit 202 that executes communication parameter sharing processing for sharing communication parameters between apparatuses. In the communication parameter sharing processing, a providing apparatus provides communication parameters for performing wireless communication to a receiving apparatus. Here, the communication parameters include wireless communication parameters, such as a Service Set Identifier (SSID) serving as a network identifier, an encryption scheme, an encryption key, an authentication scheme, and an authentication key, that are necessary for wireless LAN communication. Further, the communication parameters may include a connector defined in DPP, a Media Access Control (MAC) address, a Pre-Shared Key (PSK), a passphrase, an Internet Protocol (IP) address for performing communication in an IP layer, and information necessary for a service executed in a high layer. The communication parameter sharing processing executed by the communication parameter control unit 202 is DPP.

A barcode reading control unit 203 is a barcode reading control unit that analyzes images, such as a barcode, and a two-dimensional code, e.g., a QR code captured by the image capturing unit 106, to acquire coded information. The barcode reading control unit 203 captures an image of code information including a public key to be used in the execution of the communication parameter sharing processing by using the image capturing unit 106, and acquires the captured image. The code information may be a two-dimensional code, such as a Computer Purpose (CP) code or a QR code, or a one-dimensional code, such as a barcode. The barcode reading control unit 203 analyzes the image of the code information acquired by image-capturing by the image capturing unit 106, and acquires coded information. In the present exemplary embodiment, the code information can include information to be used in the communication parameter sharing processing. The information used in the communication parameter sharing processing is information, such as a public key used for authentication processing and an identifier of the apparatus. The public key is information used for enhancing security in the communication parameter sharing processing, and may be information, such as a certificate or a password. The public key is one type of encryption key used in a public key cryptosystem.

A barcode generation control unit 204 generates an image expressed in a barcode, or a two-dimensional code, such as a QR code, and performs control for displaying images, such as, the generated barcode, or the two-dimensional code, such as the QR code, on the display unit 105. The barcode generation control unit 204 generates code information including information, such as a public key used in the execution of the communication parameter sharing processing or an identifier of the communication apparatus. A service control unit 205 is a service control unit in an application layer. The application layer here indicates a service provision layer in high layers that are the fifth and higher layers in the Open Systems Interconnection (OSI) Reference Model (seven layers). In other words, the service control unit 205 executes processing, such as print processing, image streaming processing, and file transfer processing, using wireless communication performed by the wireless unit 104.

A packet reception unit 206 and a packet transmission unit 207 control transmission and reception of every packet including a communication protocol of high layers. The packet reception unit 206 and the packet transmission unit 207 control the wireless unit 104 to transmit and receive packets compliant with the IEEE 802.11 standard to and from an opposing apparatus.

A station function control unit 208 provides an STA function operating as a station (STA) in an infrastructure mode defined in the IEEE 802.11 standard. When operating as a STA, the STA function control unit 208 performs, for example, authentication and encryption processing. An access point function control unit 209 provides an AP function to operate as an access point (AP) in the infrastructure mode defined in the IEEE 802.11 standard. The AP function control unit 209 forms a wireless network, and performs authentication and encryption processing for STA and management of STA. A data storage unit 210 controls writing and reading of software itself, communication parameters, and information of a barcode or the like to and from the storage unit 103. In a case where the communication apparatus 101 is an access point 302, the barcode reading control unit 203 and the like can be omitted.

Operation of the communication system having the above-described configuration will be described. The access point 302 forms the network 303, and the smartphone 304 holds communication parameters for enabling connection to the access point 302. For a method of acquiring the communication parameters in the smartphone 304, an existing protocol, such as Wi-Fi Protected Setup (WPS) or AirStation One-Touch Secure System (AOSS), may be used in a case where the access point 302 does not support DPP. In a case where the access point 302 supports DPP, automatic setting using DPP or the like may be used. Alternatively, the user may perform manual inputs using the input unit 109.

Figure 4:
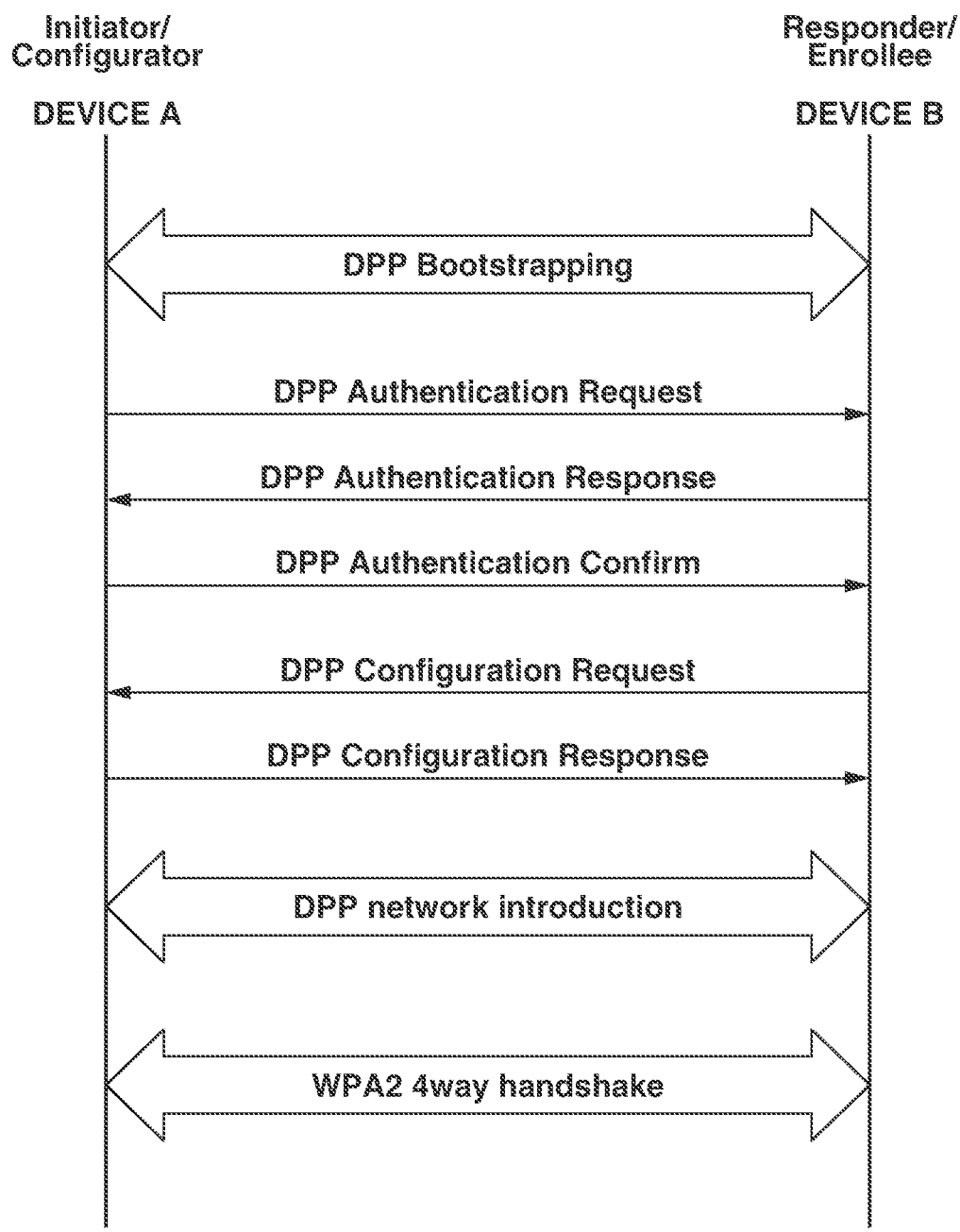
FIG. 4 is a sequence diagram illustrating operation between communication apparatuses according to the present exemplary embodiment.

FIG. 4 illustrates a sequence of operation between two communication apparatuses. A device A is a configurator that provides communication parameters, and corresponds to the smartphone 304 illustrated in FIG. 3.

A device B is an enrollee that receives the communication parameters, and corresponds to the access point 302 or the printer 305 illustrated in FIG. 3. In the following description, a communication parameter providing apparatus will be referred to as a configurator, and a communication parameter receiving apparatus will be referred to as an enrollee.

Based on the DPP specification, DPP Authentication processing is performed after DPP Bootstrapping processing is executed between the device A and the device B.

Afterwards, DPP Configuration processing is performed. In the DPP Configuration processing, at first, the enrollee performs DPP Configuration Request transmission processing. The configurator having received this DPP Configuration Request confirms a content, and transmits a DPP Configuration Response to the enrollee.

Details of the DPP Configuration processing will be described below with reference to FIG. 7 and FIG. 8.

In a case where the device A and the device B directly connect to each other, Wi-Fi Protected Access (WPA)2 4WayHandshake processing is performed and connection processing is completed after DPP Network Introduction processing is performed.

Figure 7:
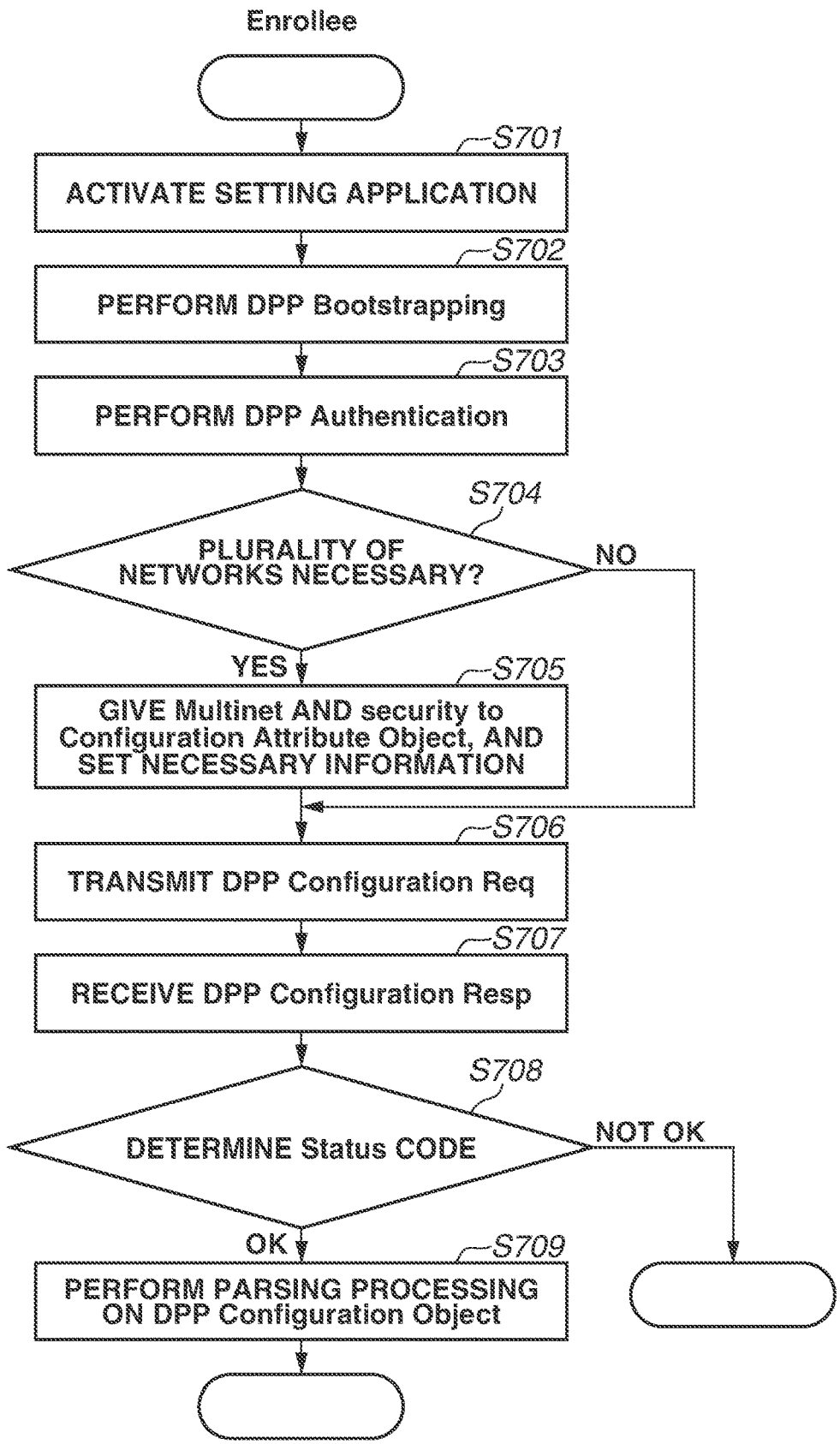
FIG. 7 is a flowchart (Part 1) illustrating operation of a communication apparatus according to the present exemplary embodiment.

FIG. 7 is a diagram illustrating an example of an operation flow of the device B illustrated in FIG. 4, which is a communication apparatus operating as the enrollee serving as the communication parameter receiving apparatus.

In step S701, to perform the communication parameter sharing processing by DPP, the enrollee activates a communication parameter setting application, in response to acceptance of an instruction for starting DPP via the display unit 105 and the input unit 109 operated by the user. In step S702, the enrollee then performs the DPP Bootstrapping processing defined in the DPP specification. The DPP Bootstrapping processing is processing of sharing a public key between the enrollee and the configurator, using a QR code. Specifically, the DPP Bootstrapping processing is processing in which one of the enrollee and the configurator encodes information of a public key being held and generates a QR code, and the other reads the QR code and obtains the information of the public key. In the DPP Bootstrapping processing, the public key may be shared utilizing wireless communication based on, for example, Wi-Fi, near field communication (NFC), and Bluetooth® in place of the QR code.

In step S703, the enrollee performs the DPP Authentication processing, subsequently. The DPP Authentication processing is processing of performing authentication between the enrollee and the configurator, using the information of the public key shared by the above-described DPP Bootstrapping processing.

In step S704, the enrollee determines whether a plurality of pieces of network information is necessary as communication parameters. In S705, the enrollee generates a Configuration Attribute Object. Specifically, in a case where a plurality of pieces of network information is determined to be necessary in step S704, the enrollee sets a necessary network encryption scheme in the Configuration Attribute Object defined in the DPP specification, as illustrated in FIG. 5. Further, the enrollee sets a request list for validity/invalidity of a plurality of networks in the Configuration Attribute Object, as illustrated in FIG. 5. In the example illustrated in FIG. 5, the DPP scheme and the WPA3 scheme are requested as a necessary network encryption scheme, and a communication parameter indicating validity of a plurality of networks is set. Setting the information of the network encryption scheme in the Configuration Attribute Object may be omitted.

In contrast, in a case where a plurality of pieces of network information is determined to be unnecessary as a result of the determination in S704, the enrollee does not set a network encryption scheme and a request list for validity/invalidity of a plurality of networks in the Configuration Attribute Object.

In S706, the enrollee transmits a DPP Configuration Request packet including the Configuration Attribute Object generated in S705 to the configurator.

In step S707, the enrollee receives a DPP Configuration Response packet from the configurator after transmitting the DPP Configuration Request packet. In a case where a response packet from the opposing configurator is not received after the packet transmission in S706, the enrollee performs timeout processing or packet retransmission processing.

In a case where the enrollee receives the DPP Configuration Response packet in S707, in step S708, the enrollee refers to a field referred to as a DPP Status set in this packet. This indicates a processing result in the configurator, and indicates whether the processing has been successful or unsuccessful.

In a case where a value indicating success is stored in S708, the enrollee performs parsing processing on the DPP Configuration Object, and in step S709, the enrollee acquires communication parameter information notified from the configurator.

The enrollee sets the communication parameter information acquired in S709 in its own apparatus. In a case where a plurality of pieces of network information (e.g., a plurality of SSIDs) is included in the acquired communication parameters, the enrollee sets all the pieces of network information included. Alternatively, the enrollee sets any one automatically selected from the pieces of network information. The selection may be randomly performed, or a piece of network information having higher security may be selected by referring to security information of each network. Alternatively, a screen for prompting the user to select a piece of network information to be set may be displayed, and the selected piece of network information may be set after accepting the user's selection.

This makes it unnecessary to execute the DPP processing a plurality of times to set the plurality of pieces of network information, reduces an operation burden on the user, and also decreases the processing load of the configurator and the enrollee.

Figure 8:
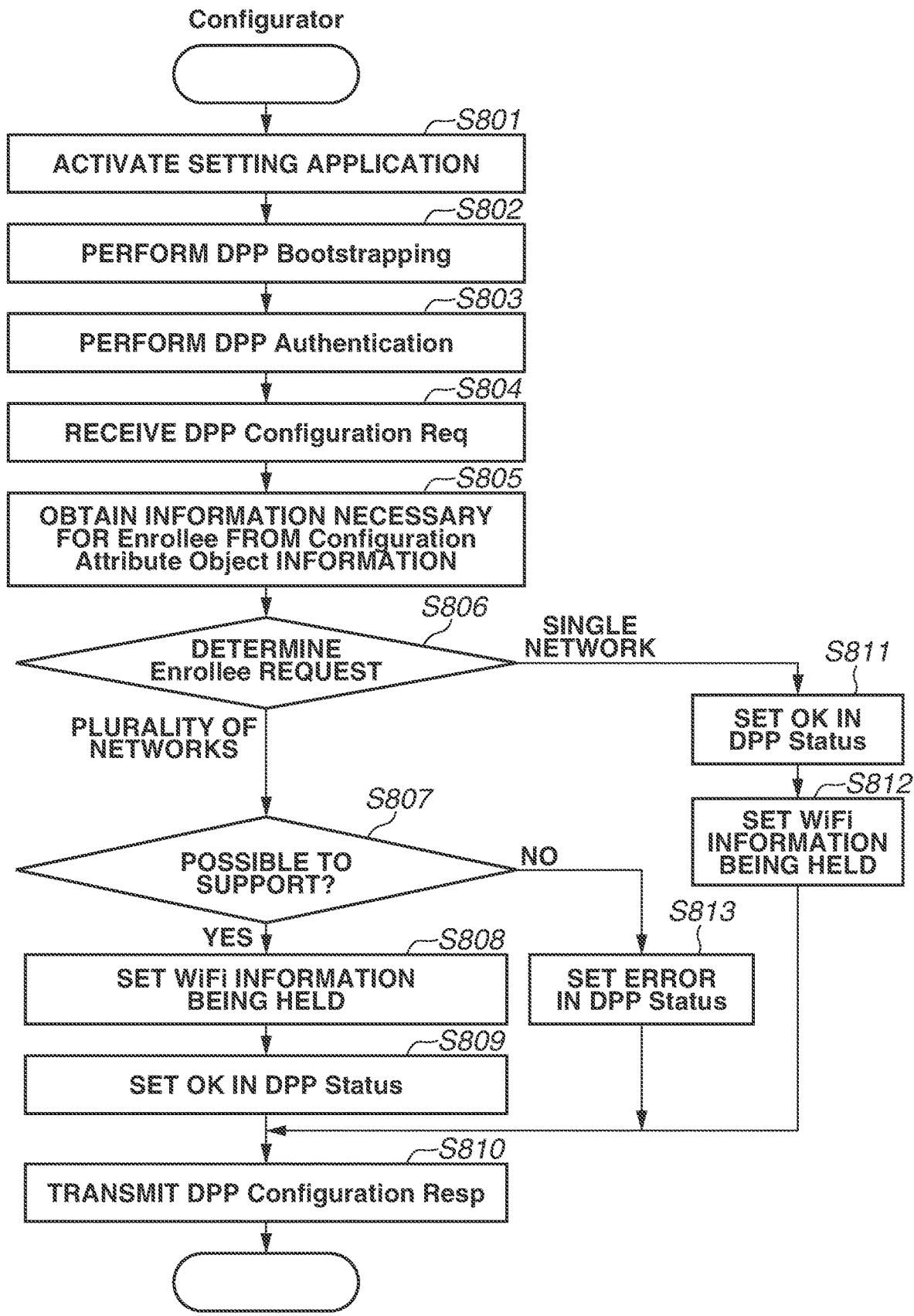
FIG. 8 is a flowchart (Part 2) illustrating operation of a communication apparatus according to the present exemplary embodiment.

FIG. 8 is a diagram illustrating an example of an operation flow of the device A illustrated in FIG. 4, which is a communication apparatus operating as the configurator serving as the communication parameter providing apparatus.

In step S801, to perform the communication parameter sharing processing by DPP, the configurator activates a communication parameter setting application, in response to acceptance of an instruction for starting DPP via the display unit 105 and the input unit 109 operated by the user. In step S802, the configurator then performs the DPP Bootstrapping processing defined in the DPP specification. The DPP Bootstrapping processing is performed as described above.

In step S803, the configurator performs the DPP Authentication processing, subsequently. The DPP Authentication processing is performed as described above.

In step S804, the configurator then receives the DPP Configuration Request packet transmitted from the enrollee. In the DPP Configuration Request packet, the type of the information requested by the enrollee is set in the Configuration Attribute Object. In step S805, the configurator performs parsing processing on the Configuration Attribute Object, and confirms the information necessary for the enrollee, accordingly.

In step S806, the configurator determines the request of the enrollee, based on the information of the Configuration Attribute Object acquired in S805.

In step S811, OK is set as the DPP Status to be set in the DPP Configuration Response packet, in a case where only single piece of network information is determined to be requested by the enrollee. In step S812, the configurator sets Wi-Fi information held in the configurator and desired to be set in the enrollee, in the DPP Configuration Object. In step S810, the configurator then transmits the DPP Configuration Response packet to the enrollee, as a response to the DPP Configuration Request packet. The DPP Configuration Object is included in the DPP Configuration Response packet.

In contrast in step S807, the configurator determines whether it is possible for the configurator to support the request, in a case where a plurality of pieces of network information is determined to be requested by the enrollee in step S806.

In step S808, the configurator makes setting in the DPP Configuration Object, about the information held by the configurator and requested by the enrollee, in a case where it is determined that it is possible for the configurator to support the request in S807. In step S809, the configurator further sets OK as the DPP Status to be in the DPP Configuration Response packet.

In step S810, the configurator then transmits the DPP Configuration Response packet to the enrollee. The DPP Configuration Object is included in the DPP Configuration Response packet. FIG. 6 is an example of the DPP Configuration Object included in the DPP Configuration Response packet transmitted by the configurator in S810. In the example in FIG. 6, a plurality of SSIDs (an SSID "abcde" and an SSID "vwxyz") is included.

In step S810, the configurator sets an error as the DPP Status to be set in the DPP Configuration Response packet, in a case where it is determined that it is not possible for the configurator to support the request in S807. Thereafter in step S810, the configurator transmits the DPP Configuration Response packet to the enrollee.

As described above, according to the present exemplary embodiment, a plurality of pieces of network information can be simultaneously set in the communication parameter setting by DPP. In the present exemplary embodiment, a plurality of network identifiers to be distributed from the configurator may be a network identifier (a so-called multi-SSID) when a single access point forms a plurality of different networks. Alternatively, the plurality of network identifiers may be a network identifier of a network formed by each of a plurality of different access points.

According to the present invention, a plurality of network identifiers can be easily set in parameter sharing processing using Device Provisioning Protocol (DPP).

(Other Exemplary Embodiments)

In each of the exemplary embodiments, the case where the communication between the apparatuses is performed based on the wireless LAN communication compliant with the IEEE 802.11 is described, but this is not limitative. For example, the communication may be performed using a wireless communication medium, such as wireless USB, Bluetooth®, ZigBee, or Near Field Communication (NFC). Here, UWB includes wireless USB, wireless 1394, and WINET.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   one or more processors; and
   one or more memories including instructions that, when executed by the one or more processors, cause the communication apparatus to:
   execute processing of sharing a public key to be used in communication parameter sharing processing using a Device Provisioning Protocol (DPP);
   execute authentication processing with an apparatus that performs the communication parameter sharing processing, using the shared public key;
   receive a DPP Configuration Request packet from the apparatus, after the authentication processing; and
   transmit, to the apparatus, a DPP Configuration Response packet which is transmitted in response to the received DPP Configuration Request packet, and includes a plurality of connection parameter sets at least including first parameter sets including a first Service Set Identifier (SSID) and a first authentication method corresponding to the first SSID, and second parameter sets including a second SSID and second authentication method corresponding to the second SSID, in one packet,
   wherein the first SSID included in the one packet corresponds to a first network provided by a specific access point that forms a plurality of different networks at least including the first network and a second network and the second SSID included in the one packet corresponds to the second network provided by the specific access point.

2. The communication apparatus according to claim 1, wherein the processing of sharing the public key to be used in the communication parameter sharing processing is processing of sharing a public key by capturing an image of a QR code.

3. The communication apparatus according to claim 1, wherein the receiving the DPP Configuration Request packet includes receiving, from the apparatus, a DPP Configuration Request packet including information indicating that a plurality of connection parameter sets are requested.

4. The communication apparatus according to claim 1, wherein the transmitting the DPP Configuration Response packet includes transmitting a DPP Configuration Response packet including a plurality of connection parameter sets including a SSID, authentication method corresponding to the SSID, and a key corresponding to the SSID.

5. The communication apparatus according to claim 1, wherein execution of the instructions by the one or more processors further cause the communication apparatus to determining whether or not a plurality of the connection parameter sets are to be shared, and
   wherein the transmitting the DPP Configuration Response packet includes transmitting a DPP Configuration Response packet including the plurality of connection parameter sets to the apparatus when it is determined that the plurality of connection parameter sets are to be shared and transmitting a DPP Configuration Response packet including single connection parameter sets to the apparatus when it is determined that the plurality of connection parameter sets are not to be shared.

6. A communication method comprising:
   executing processing of sharing a public key to be used in communication parameter sharing processing using a Device Provisioning Protocol (DPP);
   executing authentication processing with an apparatus that performs the communication parameter sharing processing, using the shared public key;
   receiving a DPP Configuration Request packet from the apparatus, after the authentication processing; and
   transmitting, to the apparatus, a DPP Configuration Response packet which is transmitted in response to the received DPP Configuration Request packet, and includes a plurality of connection parameter sets at least including first parameter sets including a first Service Set Identifier (SSID) and a first authentication method corresponding to the first SSID, and second parameter sets including a second SSID and second authentication method corresponding to the second SSID, in one packet,
   wherein the first SSID included in the one packet corresponds to a first network provided by a specific access point that forms a plurality of different networks at least including the first network and a second network and the second SSID included in the one packet corresponds to the second network provided by the specific access point.

7. A non-transitory computer-readable storage medium storing a computer program for causing a computer to execute a communication method, the communication method comprising:
   executing processing of sharing a public key to be used in communication parameter sharing processing using a Device Provisioning Protocol (DPP);
   executing authentication processing with an apparatus that performs the communication parameter sharing processing, using the shared public key;
   receiving a DPP Configuration Request packet from the apparatus, after the authentication processing; and
   transmitting, to the apparatus, a DPP Configuration Response packet which is transmitted in response to the received DPP Configuration Request packet, and includes a plurality of connection parameter sets at least including first parameter sets including a first Service Set Identifier (SSID) and a first authentication method corresponding to the first SSID, and second parameter sets including a second SSID and second authentication method corresponding to the second SSID, in one packet,
   wherein the first SSID included in the one packet corresponds to a first network provided by a specific access point that forms a plurality of different networks at least including the first network and a second network and the second SSID included in the one packet corresponds to the second network provided by the specific access point.

* * * * *